United States Patent [19]

Goldberg

[11] Patent Number: 5,794,571
[45] Date of Patent: Aug. 18, 1998

[54] VEHICULAR SAFETY RESTRAINTS FOR PETS

[76] Inventor: Carl L. Goldberg, P.O. Box 19679, Boulder, Colo. 80308

[21] Appl. No.: 819,000

[22] Filed: Mar. 17, 1997

[51] Int. Cl.[6] ............................................. A01K 27/00
[52] U.S. Cl. ........................ 119/792; 119/771; 119/856
[58] Field of Search ................................... 119/771, 792, 119/856, 907

[56] References Cited

U.S. PATENT DOCUMENTS

| | | |
|---|---|---|
| 1,800,421 | 4/1931 | Wickersham et al. ............ 119/907 X |
| 2,187,021 | 1/1940 | Everson ................................ 119/792 |
| 2,605,744 | 8/1952 | Urbanski ........................... 119/856 X |
| 3,310,034 | 3/1967 | Dishart . |
| 3,948,222 | 4/1976 | Longshore et al. . |
| 4,512,286 | 4/1985 | Rux . |
| 4,676,198 | 6/1987 | Murray . |
| 4,715,618 | 12/1987 | Harris . |
| 4,896,630 | 1/1990 | Luce . |
| 4,907,541 | 3/1990 | Thompson . |
| 4,970,991 | 11/1990 | Luce ..................................... 119/771 |
| 5,035,203 | 7/1991 | Cardenas . |
| 5,134,660 | 7/1992 | Snyder et al. . |
| 5,167,203 | 12/1992 | Scott et al. . |
| 5,359,964 | 11/1994 | Sporn .................................. 119/864 |
| 5,427,061 | 6/1995 | McCullough ................... 119/792 X |
| 5,443,037 | 8/1995 | Saleme .............................. 119/771 |

*Primary Examiner*—Robert P. Swiatek
*Attorney, Agent, or Firm*—Harold A. Burdick

[57] ABSTRACT

A safety restraint for pets, utilized with an existing vehicular seat belt system, and method for constructing the restraint are disclosed. The restraint includes a harness made of a single length of webbing attached at its ends to form an endless belt, the belt having first and second closed loops formed therein by intermediate securement of one side of the belt with the opposite side of the belt. A connecting strap and tether are connected to different ones of the loops to thereby releasably associate the loops and releasably associate the harness with the seat belt system. Strap sets are utilized to associate opposite sides of the loops to provide securement and fit adjustment on the pet at each loop.

18 Claims, 4 Drawing Sheets

VEHICULAR SAFETY RESTRAINTS FOR PETS

FIELD OF THE INVENTION

This invention relates to pet restraining apparatus and methods, and, more particularly, relates to pet restraints and harnesses adaptable for use with vehicular seat belt systems.

BACKGROUND OF THE INVENTION

A variety of restraining devices for pets are known. Some such known devices are adapted for use in vehicles to restrain an animal riding therein, often in conjunction with the existing seat belt restraints in the vehicle (see U.S. Pat. Nos. 5,359,964, 5,427,061, 4,896,630, 5,146,660, 5,443,037, and 4,676,198, for example).

Use of some such heretofore known and/or utilized pet safety restraints has met with resistance from the public, and they have thus not gained wide acceptance. The single use nature (i.e., practically usable only for vehicle restraint) of some such devices, the complexity of others (both in application to the animal and within the vehicle), the expense of many such restraints, and a perception by both the user and the animal of discomfort of some such known devices when applied may be at least in part to blame for this lack of acceptance Some heretofore known pet restraints, moreover, tend to apply the restraint on the animal in a manner which could do more harm than good when subjected to sudden restraining forces (for example, applying choking, twisting or other potentially harmful forces at the animal's neck area, and/or otherwise failing to provide proper impact support for, or security on, the animal). It is thus apparent that further improvements in vehicular restraints for pets could be utilized that will lead to a wider acceptance of such devices.

SUMMARY OF THE INVENTION

This invention provides an improved safety apparatus and method for restraint of pets riding in vehicles, the apparatus utilizing the safety belts found in most modern motor vehicles. The pet safety restraint of this invention is relatively inexpensive to produce, is easy to apply on the animal and within the vehicle, and is secure and comfortable on the animal.

The safety restraint includes first and second closed loops joined at one position to each other, with a releasable breast strap set connected at opposite sides of the first loop for releasably associating the opposite sides of the first loop. Means are provided at both the loops spaced from the position of joinder for releasably linking the loops thereat and for receiving the vehicle safety belt.

A second strap set is connected at opposite sides of the second loop for releasably associating the opposite sides of the second loop. The loops are formed by a webbing of one piece construction permanently joined at opposite ends thereof to form an endless belt. Opposite sides of the endless belt are permanently joined to one another to define the loops.

First and second permanently secured folds are formed in the belt at opposite sides of the second loop causing angular redirection of the belt thereat to shape the restraint. A third permanently secured fold is formed in the belt at the first loop to likewise angularly redirect, and thus shape, the belt thereat.

This invention also provides an efficient and inexpensive method for producing the restraints of this invention.

It is therefore an object of this invention to provide an improved pet safety restraint adapted for use with a vehicle safety belt, and restraint construction method.

It is another object of this invention to provide an improved pet safety restraint that is relatively inexpensive to produce, is easy to apply on the animal and within the vehicle, and is secure, safe and comfortable on the animal.

It is still another object of this invention to provide a safety restraint for pets that includes first and second closed loops joined at one position to each other, a breast strap connected at the first loop adjacent to the position and adapted for releasably associating opposite sides of the first loop and means at both the loops spaced from the position for releasably linking the loops thereat.

It is yet another object of this invention to provide an improved pet safety restraint that includes a plurality of pet encircling loops, and first and second straps connected at different ones of the loops and adapted for releasably associating opposite sides of each loop.

It is another abject of this invention to provide a vehicular safety restraint for pets adapted for use with a vehicle safety belt, the restraint including a webbing of one piece construction permanently joined at opposite ends thereof to form an endless belt, opposite sides of the endless belt permanently joined to one another at a position selected so that first and second closed loops are defined in the endless belt, and means secured at one of the loops configured for receiving the vehicle safety belt.

It is still another object of this invention to provide a method for constructing a vehicular safety restraint for pets adapted for use with a vehicle safety belt that includes the steps of permanently joining a one piece length of webbing at opposite ends thereof to form an endless belt, permanently joining opposite sides of the endless belt to one another at a position selected so that first and second closed loops are defined in the endless belt, and securing means configured for receiving the vehicle safety belt at one of the loops.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
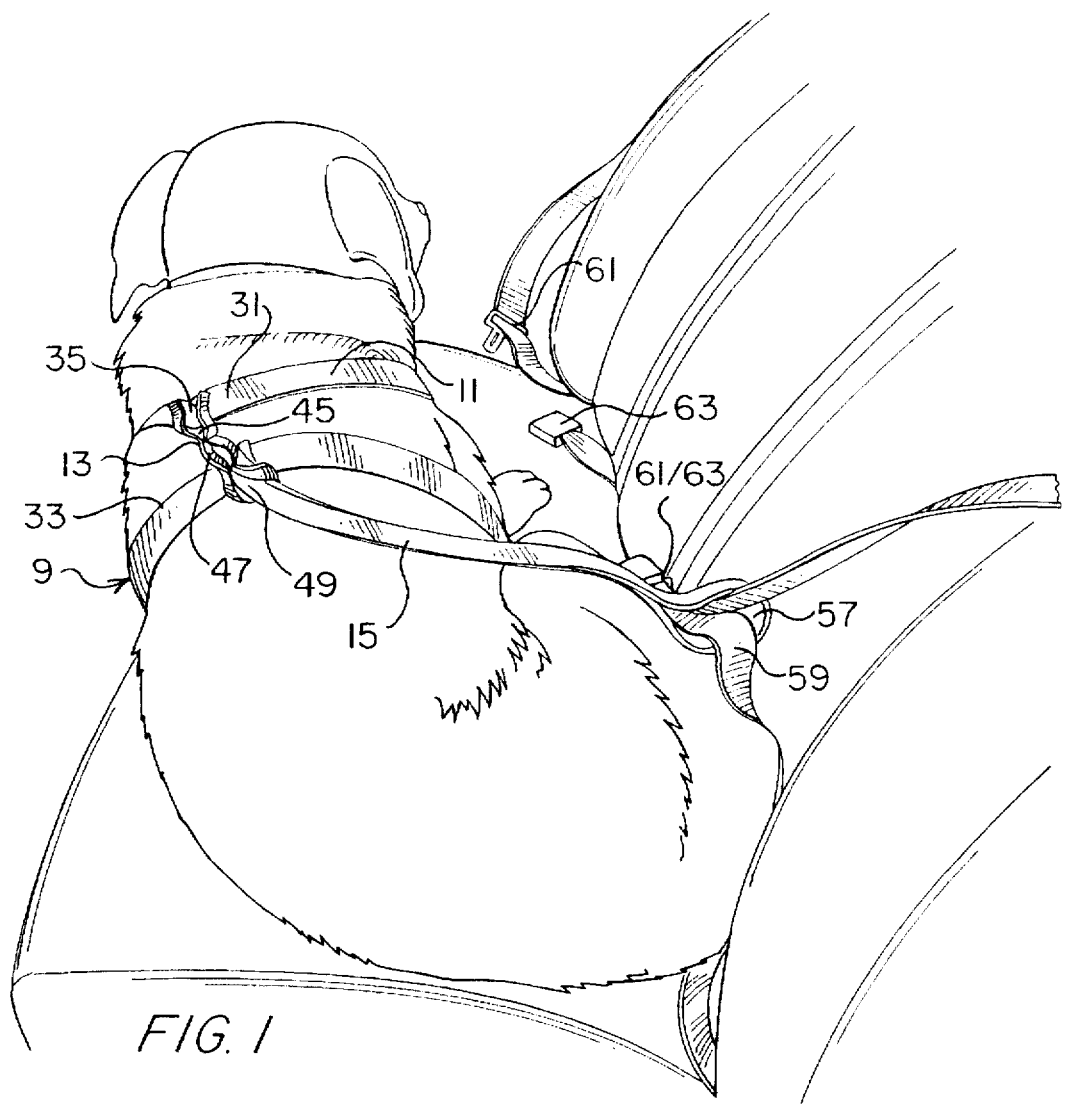
FIG. 1 is a perspective view of the pet restraint of this invention in use in a vehicle.
Figure 2:
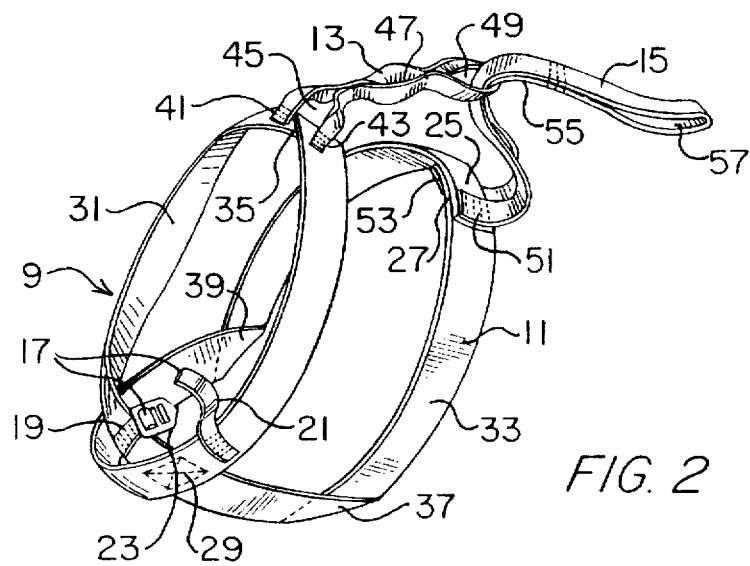
FIG. 2 is a perspective view of a first embodiment of the pet restraint of this invention.
Figure 3:
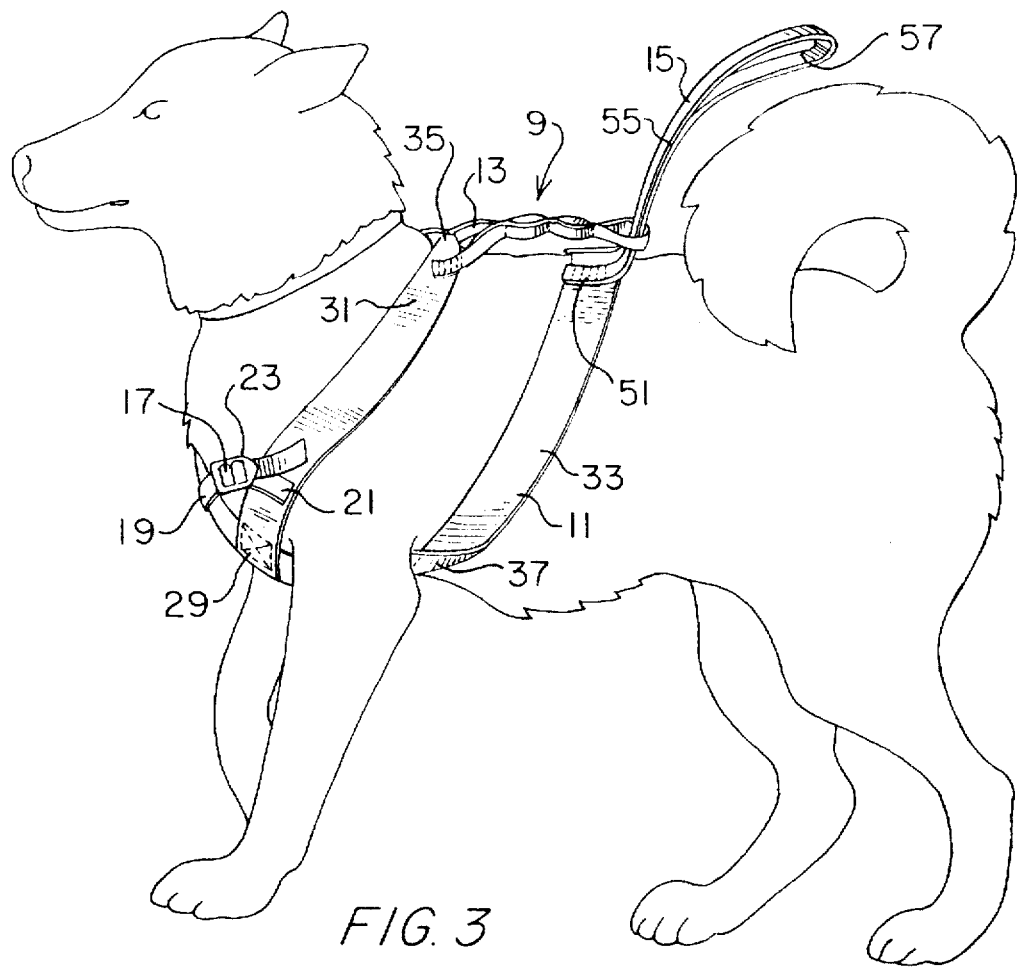
FIG. 3 is an illustration of the pet restraint of FIG. 2 in use outside of a vehicle.
Figure 4A:
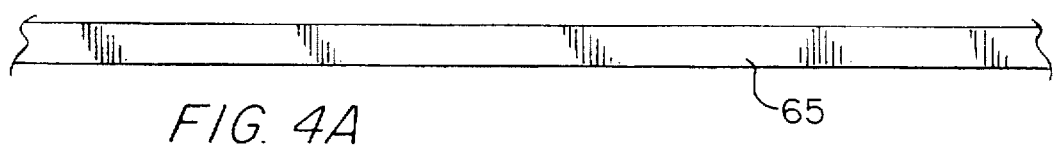
FIGS. 4A through 4F illustrate the process of making the pet restraint of FIG. 2.
Figure 4B:
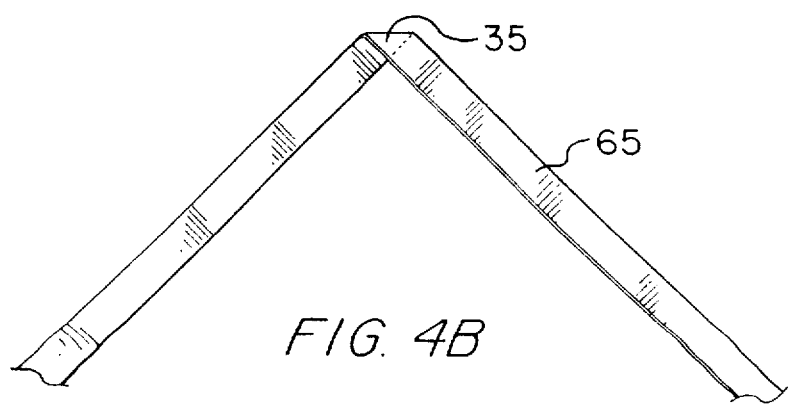
Figure 4C:
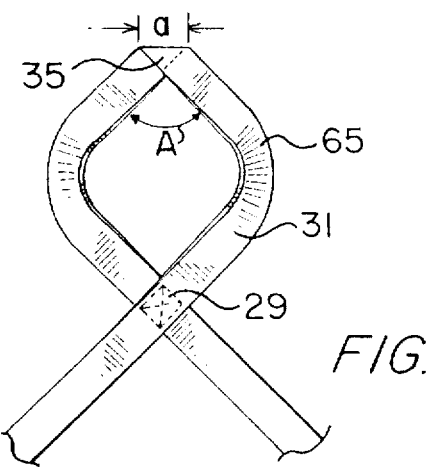
Figure 4D:
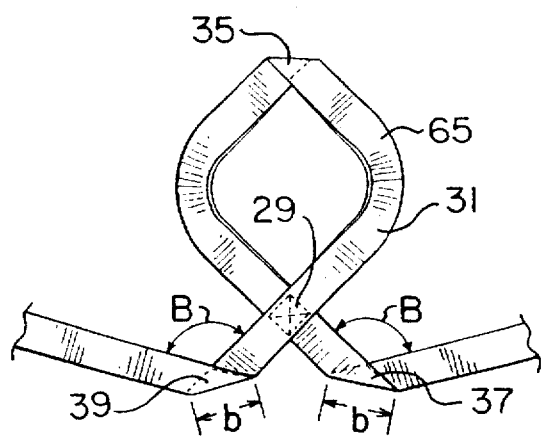
Figure 4E:
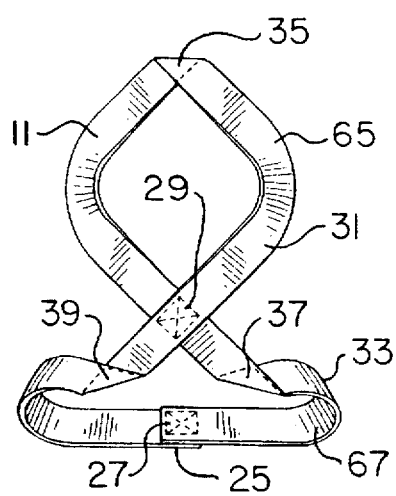
Figure 4F:
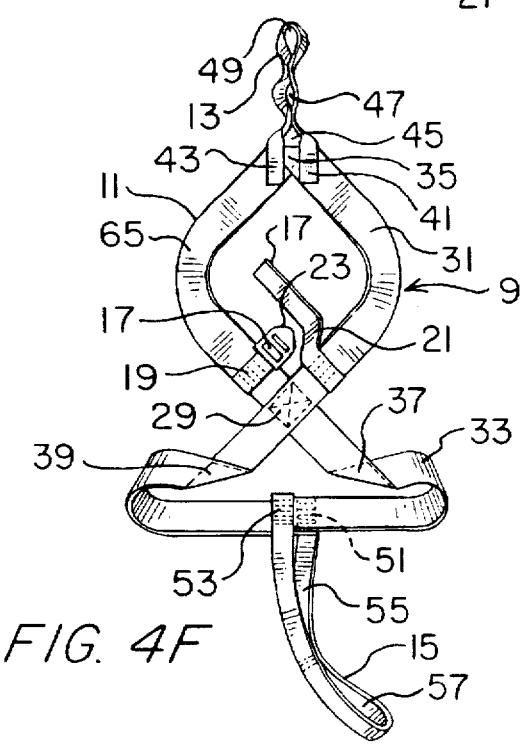

A first embodiment 9 of the vehicular safety restraint for pets of this invention is illustrated in FIGS. 1 through 3. The restraint includes harness 11, connecting strap 13, tether 15 and breast strap set 17. Breast strap set 17 includes first and second straps 19 and 21 and nylon or carbon plastic connecting buckle 23 permanently attached at strap 19 and adjustably receiving strap 21 through slots, as is known for webbing securements. Strap set 17 allows securement and fit of a harness 11 of a standardized size on animals of varying sizes within the range of the standardized size (utilizing, for example, standardized sizes extra-small, small, medium and large).

Harness 11 is formed of a webbing joined at opposite ends 25 and 27 to form an endless belt. The endless belt is joined at an intermediate position 29 (by overlapping the webbing thereat in a figure-eight-type arrangement) to form first and second closed loops 31 and 33, loop 31 being received over the animal's head and around the neck/breast area, and loop 33 being received behind the animal's forelegs and across and around the animal's torso. The webbing material has folds 35, 37 and 39 formed and secured therein to shape the harness by angularly redirecting the belt at the folds.

Connecting strap 13 is formed of a loop of webbing secured to harness 11 at its ends 41 and 43 adjacent to fold 35 (see FIG. 2). The opposite sides of the loop thus formed for connecting strap 13 are secured at plural intermediate positions therealong to define plural loci 45, 47 and 49 (a greater or lesser number of loci could be provided) for receipt of tether 15 therethrough (again to accommodate different sized animals and fit).

Tether 15 is also formed of a loop of webbing secured to harness 11 at its ends 51 and 53 adjacent to the interconnection of opposite ends 25 and 27 (one end above and one end below the interconnection) of the webbing of harness 11. The opposite sides of the loop thus formed for tether 15 are secured at an intermediate position therealong to define plural loci 55 and 57 (a greater or lesser number of loci could be provided) for receipt of a seat belt therethrough (lap, shoulder or combination belt 59 as shown in FIG. 1, to accommodate greater or lesser scope of animal movement in a vehicle when the seat belt is secured to the restraint).

In use, harness 11 is applied to the animal as discussed above and shown in FIGS. 1 and 3. Tether 15 is laced through a selected loci along connecting strap 13, tether 15 being thereafter slidable relative to connecting strap 13, and breast strap set 17 is buckled and tightened to fit. Tether 15 may serve much as the manually held end of a leash before entry and after exit of the animal from a vehicle (see FIG. 3), and serves as the interconnector of restraint 9 with the vehicular seat belt safety restraint when belt 59 is fed through selected loci 55/57 of tether 15 and secured by its buckles 61/63.

As shown in FIGS. 4A through 4F, restraint 9 is constructed by first providing a single length of webbing 65 (for example, about a 63"—for a medium to larger size restraint harness 11—length of 1.75" wide heavy nylon webbing, which length and width will be utilized for illustrative purposes as this description proceeds, it being understood that other widths and lengths could, and would, be utilized thereby requiring scaling of other measurements hereinafter following). At the midspan of the length of webbing 65, the webbing is folded over and secured (by stitching, heat welding, gluing, or a combination thereof, for example) to form fold 35. Using a 1.75" webbing, for example, the fold is preferably formed along about a 2" span "a", thus forming about a 100° interior angle "A".

Webbing 65 is lapped over itself at position 29 (at about 14" on each opposite side, center to center, from fold 35) and secured thereat (using methods as discussed above) to thereby form closed loop 31. Each side of the webbing extending from position 29 has a fold formed therein (folds 37 and 39, each at about 5.5" from the center of position 29 to the center of the fold), folds 37 and 39 being secured in the same manner as fold 35. Folds 37 and 39 redirect webbing 65 outwardly thereat and are preferably formed along about a 2.75" span "b", thus forming about a 130° exterior angle "B".

Ends 25 and 27 of webbing 65 are overlapped (about a 1.75" overlap at about 12" on each side from the center of folds 37 and 39) and secured (again utilizing the methods above discussed) thus forming closed loop 33 of harness 11. As may be appreciated, this connection of ends 25 and 27 forms an endless belt 67 of webbing 65, which endless belt has closed loops 31 and 33 formed therein by intermediate securement (at position 29) of webbing 65. The resultant construction may thus be seen to provide with great simplicity (and resultant cost savings) harness 11.

Connecting strap 13 and tether 15 (having loci 45/47/49 and 55/57 defined therein, by stitching or the like) are connected, as discussed above, with harness 11 (at fold 35 and adjacent to ends 25 and 27, respectively). Strap 13 is made of 0.75" nylon webbing, for example, and tether 15 is made of 1" heavyweight nylon webbing, for example. Breast strap set 17 (strap 19/buckle 23 and strap 21) is connected at opposite sides of loop 31 using the methods discussed above, with straps 19 and 21 being located at their respective opposite sides about 2" from position 29 (center to center). In this fashion, the opposite sides of loop 31 may be associated for adjusting securement and fit of loop 31 on the animal.

Figure 6:
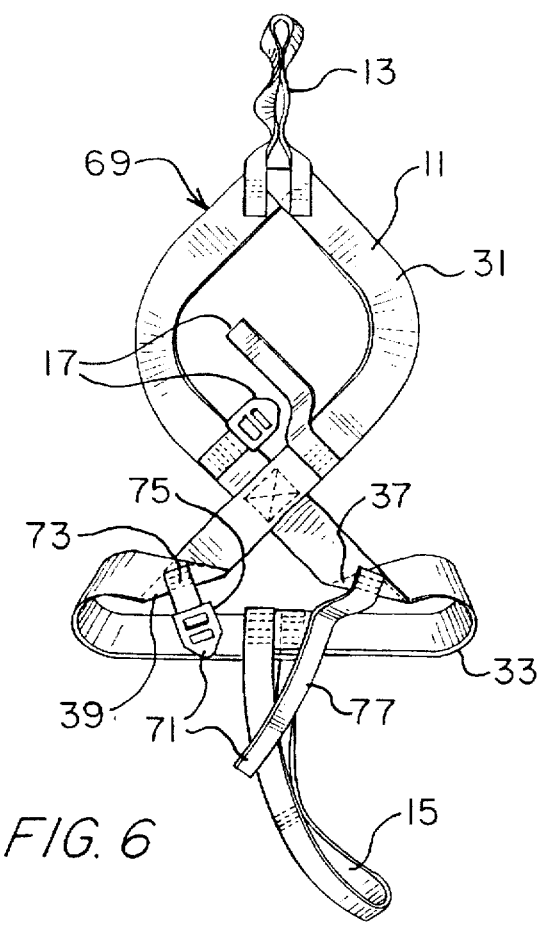
FIG. 6 is another view of the pet restraint of FIG. 5.
Figure 5:
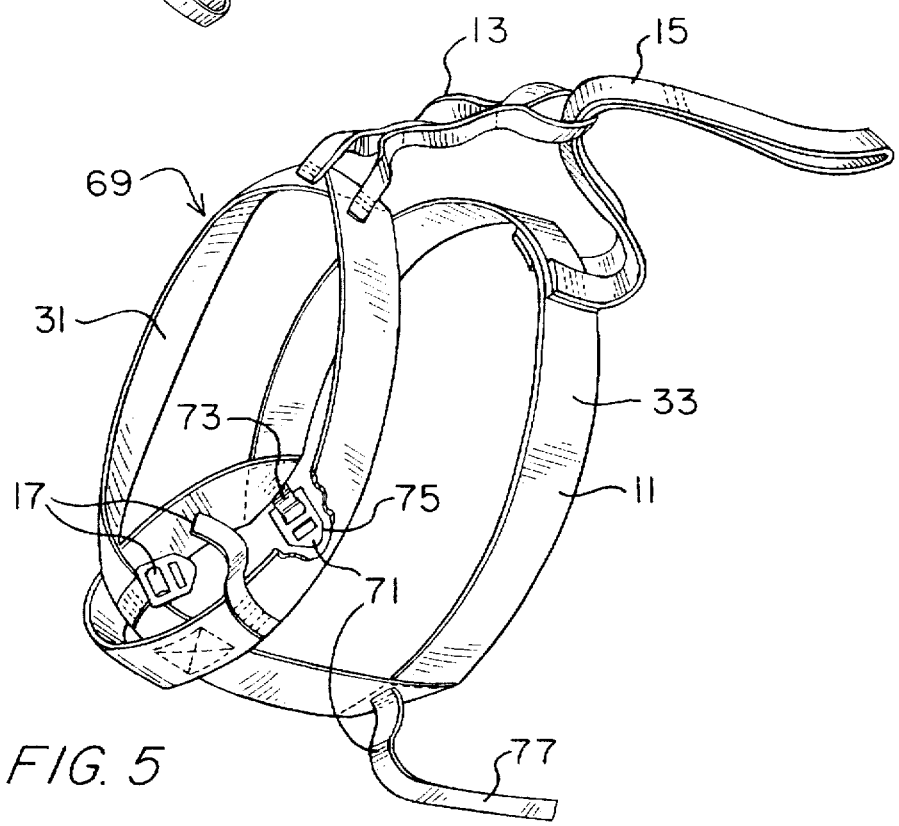
FIG. 5 is a perspective view having a portion cut away and showing a second and preferred embodiment of the vehicular safety restraint of this invention.

A second embodiment 69 of this invention is illustrated in FIGS. 5 and 6 which provides increased security of harness 11 on animals (less likelihood of removal thereof by the pet), particularly where the animal is of a small size within the range of a standardized size harness. In most respects, embodiment 69 is identical to embodiment 9 of the restraint of this invention. In addition, however, strap set 71 is provided for associating opposite sides of closed loop 33, thus providing securement and fit adjustment at loop 33. Strap set 71, like breast strap set 17, includes strap 73, having buckle 75 linked thereto, and strap 77. Strap 73 is connected with harness 11 at fold 39, and strap 77 is connected with harness 11 at fold 37. The various connecting techniques discussed above may also be utilized for connection of straps 73 and 77 to the harness.

Materials and connections discussed above should be calculated to provide in excess of about 5,000 pounds of load at all points along the webbing (and preferably about 6,000 pounds or more) so that, in use, accident forces can be predictably resisted. If stitching is utilized at least in part for the various connections, fold securements and the like, 69 to 92 weight nylon thread and, particularly at high stress connections, multiple stitch bars, both horizontal and vertical, are preferably utilized. Nylon webbing material used in the harness is preferably about a 10,000 pound, or greater, test material, other webbings utilized herein being of equal or lighter weight material.

As may be appreciated from the foregoing, an improved pet restraint for use with vehicular seat belt systems is provided which is of greatly simplified construction. The simplification of construction provides a restraint system that, while sacrificing nothing in the way of strength and utility, is quite convenient for the pet owner to put into use thus increasing the likelihood that such a restraint will in fact be used.

What is claimed is:

1. A safety restraint for pets comprising:

first and second closed loops joined at one position to each other;

a breast strap connected at said first loop adjacent to said position and adapted for releasably associating opposite sides of said first loop; and means at both said loops spaced from said position for releasably linking said loops thereat.

2. The safety restraint of claim 1 further comprising a second strap connected at said second loop adjacent to said position and adapted for releasably associating opposite sides of said second loop.

3. The safety restraint of claim 1 wherein said means for releasably linking said loops includes a tether connected to said second loop at a side opposite said one position, said tether including a portion configured to receive a seat belt.

4. The safety restraint of claim 3 wherein said means for releasably linking said loops includes a connecting strap having a portion configured to slidably receive said tether therethrough.

5. The safety restraint of claim 4 wherein said connecting strap has plural discrete loci formed therealong for receipt of said tether at a selected one of said loci.

6. The safety restraint of claim 3 wherein said tether has plural discrete loci formed therealong for receipt of the seat belt at a selected one of said loci.

7. A vehicular safety restraint for pets adapted for use with a vehicle safety belt, said restraint comprising:

a webbing of one piece construction permanently joined at opposite ends thereof to form an endless belt, opposite sides of said endless belt permanently joined to one another at a position selected so that first and second closed loops are defined in said endless belt, said webbing having first and second permanently secured folds formed therein, one each at opposite sides of said second closed loop and spaced from said position, said first and second folds angularly redirecting said belt thereat; and means secured at one of said loops configured for receiving the vehicle safety belt.

8. The safety restraint of claim 7 further comprising a breast strap set connected at said first loop adapted for releasably associating opposite sides of said first loop, and a second strap set connected at said second loop adapted for releasably associating opposite sides of said second loop.

9. The safety restraint of claim 7 further comprising a third permanently secured fold formed in said webbing at said first loop opposite said position, said third fold angularly redirecting said belt thereat.

10. The safety restraint of claim 9 further comprising a connecting strap connected at said third fold and having a portion configured to maintain said means for receiving the safety belt therethrough, said means for receiving the safety belt secured at said second loop between said first and second folds.

11. The safety restraint of claim 7 wherein said means for receiving the safety belt is of a length sufficient to be used to manually restrain the pet outside of a vehicle.

12. A method for constructing a vehicular safety restraint for pets adapted for use with a vehicle safety belt, said method comprising the steps of:

permanently joining a one piece length of webbing at opposite ends thereof to form an endless belt;

permanently joining opposite sides of said endless belt to one another at a position selected so that first and second closed loops are defined in said endless belt;

permanently securing a fold in said webbing at said first closed loop opposite said position, said fold angularly redirecting said belt thereat; and securing means configured for receiving the vehicle safety belt at one of said loops.

13. The method of claim 12 further comprising the step of connecting a breast strap at said first loop adjacent to said position and thereby releasably associating opposite sides of said first loop.

14. The method of claim 13 further comprising the step of connecting a second strap at said second loop adjacent to said position and thereby releasably associating opposite sides of said second loop.

15. The method of claim 12 wherein said means for receiving the safety belt is secured at said second loop, said method further comprising the step of attaching connecting means at said first loop for releasably maintaining thereat said means for receiving the safety belt.

16. The method of claim 15 further comprising the steps of forming plural discrete loci along said connecting means for receipt of said means for receiving the safety belt at a selected one of said loci, and forming plural discrete loci along said means for receiving the safety belt for receipt of the safety belt at a selected one of said loci formed along said means for receiving the safety belt.

17. The method of claim 12 wherein said means for receiving the vehicle safety belt is formed of a webbing having a length sufficient to be used to manually restrain the pet outside of a vehicle.

18. The method of claim 12 further comprising the step of permanently securing first and second folds formed in said webbing, one each at opposite sides of said second loop and spaced from said position, said folds angularly redirecting said belt thereat.

* * * * *